(12) United States Patent
Hodge

(10) Patent No.: US 6,604,731 B2
(45) Date of Patent: Aug. 12, 2003

(54) UTILITY WINCH

(75) Inventor: Stephen Ray Hodge, North Plains, OR (US)

(73) Assignee: Warn Industries, Inc., Milwaukie, OR (US)

( * ) Notice: Subject to any disclaimer, the term of this patent is extended or adjusted under 35 U.S.C. 154(b) by 0 days.

(21) Appl. No.: 10/011,348

(22) Filed: Nov. 12, 2001

(65) Prior Publication Data

US 2003/0089897 A1 May 15, 2003

(51) Int. Cl.$^7$ .................................................. B66D 1/22
(52) U.S. Cl. ............................... 254/344; 254/356
(58) Field of Search ............................ 254/342, 344, 254/356

(56) References Cited

U.S. PATENT DOCUMENTS

| | | | | |
|---|---|---|---|---|
| 2,255,574 A | * | 9/1941 | Waseige | 254/267 |
| 2,402,756 A | * | 6/1946 | Lawler | 254/344 |
| 2,891,767 A | * | 6/1959 | Armington, Jr. | 254/344 |
| 4,211,388 A | * | 7/1980 | Guangorena | 254/344 |
| 4,452,429 A | * | 6/1984 | Muessel | 254/344 |
| 4,736,929 A | * | 4/1988 | McMorris | 254/344 |
| 5,860,635 A | * | 1/1999 | Morfitt et al. | 254/377 |

OTHER PUBLICATIONS

"Dudley's Gear Handbook" 2nd Edition, Townsend pp. 3.14–3.21.

Machinery's Handbook 25th Edition, Oberg, et al pp. 480, 481, 1924 and 1925.

"Product Engineering Magazine", Jan. 6, 1964, Glover pp. 59–69.

* cited by examiner

Primary Examiner—Emmanuel Marcelo
(74) Attorney, Agent, or Firm—Harness, Dickey & Pierce, P.L.C.

(57) ABSTRACT

A utility winch having a single planet gear assembly that commonly engages adjacent ring gears, one ring gear fixed and the other rotatable. The planet gears of the planet assembly have inner and outer portions that rotate together and have different diameters and different numbers of teeth, one ring gear engaged with an inner portion and a second ring gear engaged with an outer portion of the planet gears. Said ring gears matched to the respective planet gear portions and having different numbers of teeth and different diameters as required to achieve involute engagement of the ring gears and planet gears whereby the rotatable gear is caused to rotate at a substantially reduced rate of rotation. Said rotatable ring gear is fixed to the winch reel for reduced rotation of the reel.

7 Claims, 3 Drawing Sheets

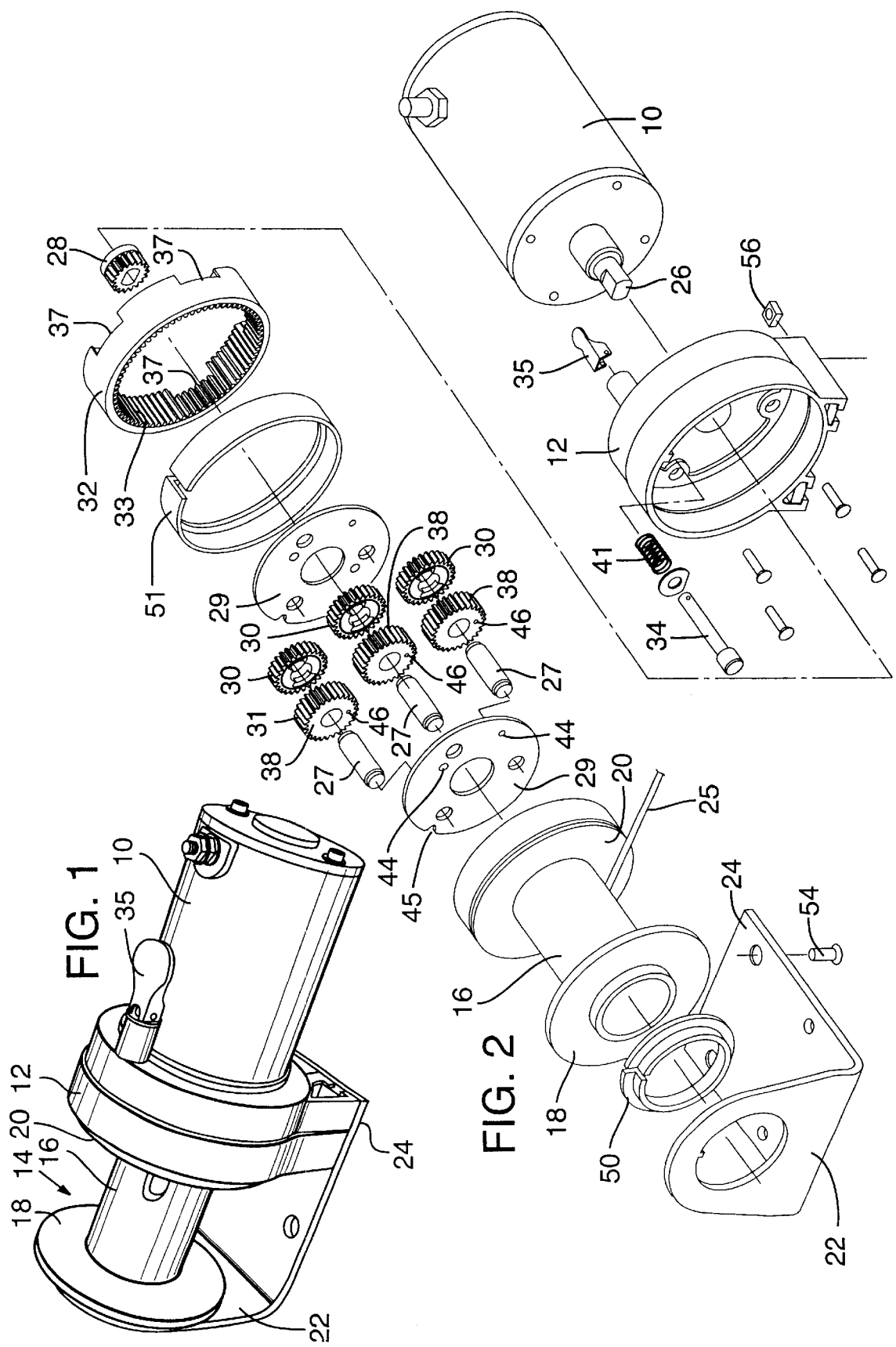

UTILITY WINCH

FIELD OF THE INVENTION

This invention relates to a low cost utility winch wherein large ratios are enabled by the winch, e.g., for pulling a 2,000 pound weight, but having fewer parts than is typical for such winches.

BACKGROUND OF THE INVENTION

A typical heavy duty winch powered by a vehicle battery and for pulling a heavy weight, e.g., to free the vehicle from a stuck condition, includes a series of planetary gear arrangements, e.g., a series of three planetary gear arrangements that reduce the rpms of a motor drive shaft (to thereby increase torque output) on the order of 200 to 1. Each planetary gear arrangement includes a sun gear, a carrier assembly including three planet gears and a ring gear and accordingly in combination, the three planetary gear arrangements collectively require a large number of parts that contribute substantially to the cost of producing the winch.

A less expensive winch to be used for utility applications, i.e., having infrequent use and requiring a lesser pull power, e.g., 2,000 pounds, was developed prior to the present invention to produce the desired gear reduction (on the order of 200 to 1) but with far fewer parts. Such was accomplished using a single planetary gear arrangement. In this prior device, a sun gear is connected directly to the armature shaft of the motor and the sun gear engages three planet gears. The planet gears engage a first ring gear that is non-rotatable. The planet gears axially extend beyond their engagement with the sun gear and the ring gear. A second rotatable ring gear having the same diameter as the first ring gear is placed into engagement with the extended portions of the planet gears. The teeth of one or both ring gears are modified so that one ring gear has fewer teeth than the other, e.g., 70 teeth v. 71 teeth.

To accomplish the above modification, at least one of the ring gears have teeth that do not have an involute inter-engagement with the planets as required for optimum performance. However, there is sufficient mating of the teeth to enable sequential engagement between the teeth of the planets and the teeth of both ring gears. Thus, as the planets are forced to rotate by the sun gear and because the first ring gear is fixed, the planet gears move in a circular pattern relative to the axis of the fixed ring gear. The second ring gear can rotate and with each completed circle of the planets about the ring gear axis, the second ring gear rotates the distance of one tooth, i.e., 1/70th of the circle. The rotatable second ring gear is fixedly mounted to the reel of the winch so that similarly the reel rotates 1/70th of a turn for each full circle of the planets about the axis.

The problem with the above arrangement is that the non-involute or offset meshing of the teeth (between the planets and one of the ring gears) creates undesired noise, loss of efficiency and more rapid wearing of the affected parts. The present invention is also directed to a dual ring gear combination but designed to alleviate the problems of the offset meshing teeth.

BRIEF DESCRIPTION OF THE INVENTION

The preferred embodiment of the present invention also includes a single planetary gear arrangement. A sun gear (connected to the motor's drive shaft) drives surrounding planet gears (planets) and the planets are in meshed engagement with a first ring gear. The sun gear, planets and first ring gear are cooperatively configured to provide involute gear teeth inter-engagement. A second ring gear is provided with gear teeth greater in number than the first ring gear, e.g., 71 gear teeth for the second ring gear v. 70 gear teeth for the first ring gear. The planets (three of them) are axially extended beyond the first ring gear and the extended portion is configured to have a greater number of teeth than that portion engaged with the first ring gear, e.g., 27 teeth v. 26 teeth for the portion engaged with the first ring gear. The second ring gear having 71 teeth and the planet gear portions having 27 teeth are cooperatively configured to provide involute inter-engagement and in doing so, the rotatable ring gear is slightly larger in diameter than the first ring gear, as is the extended planet portions larger in diameter than the first planet portions. With the arrangement described, the planets will rotate around their own axis 2.69 times in order for the planets to complete a full circle of movement around the first ring gear axis which is held fixed, i.e., 70÷26. The planets complete a full circle around the second or rotatable ring gear in 2.63 revolutions of the planets, i.e., 71÷27. Thus, the rotatable ring gear is rotated in reverse by about 0.06 of a revolution for every complete revolution of the planets about the first ring gear. Thus the rotatable ring gear rotates in reverse the distance of 1.5 teeth which requires 45 revolutions of the planets to produce a single revolution of the second ring gear.

As a further cost saving feature, the planet gears are rotatably mounted with bearings to provide a desired but limited friction which is overcome by providing a slightly higher powered motor than what would otherwise be required using lower friction bearings. However, the limited resistance to rotation by the planets produces substantial resistance to a force that urges rotation of the second ring gear with the motor inactive (resulting from the high ratio reduction as explained). Thus, the bearing friction produces a highly effective brake and is well within the needs of the weight rating of the utility winches contemplated herein.

A further improvement is provided in the manner of mounting the second ring gear and reel to the motor and gear housing. To enable the desired fit of the clutch ring to the planets without having to critically form the holding bracket for the reel, the attachment of the bracket to the housing of the motor is a sliding interfit. This enables the bracket to be loosely mounted to the housing by a bolt-nut arrangement. It is then adjusted as necessary to obtain the desired fit between the planets and the second ring gear at which point the bolt is tightened.

A further problem that was encountered and resolved is the assembly of the planets to the first ring gear, the planets being fixed at their axes relative to each other by a carrier. The planets as mounted are not symmetrical about the carrier axis (also the ring gear and sun gear axis) and the gears have to be rotatively aligned to fit the ring gears and sun gear. This rotative alignment, upon being established, is replicated for assembly by providing an alignment dot or hole on each planet to be aligned with holes in the carrier.

The above will be more fully appreciated and understood upon reference to the following detailed description having reference therein to the accompanying drawings.

DESCRIPTION OF THE DRAWINGS

FIG. 1 is an isometric view of a utility winch in accordance with the present invention;

FIG. 2 is an exploded isometric view of the winch of FIG. 1;

DETAILED DESCRIPTION OF THE INVENTION

Figure 3:
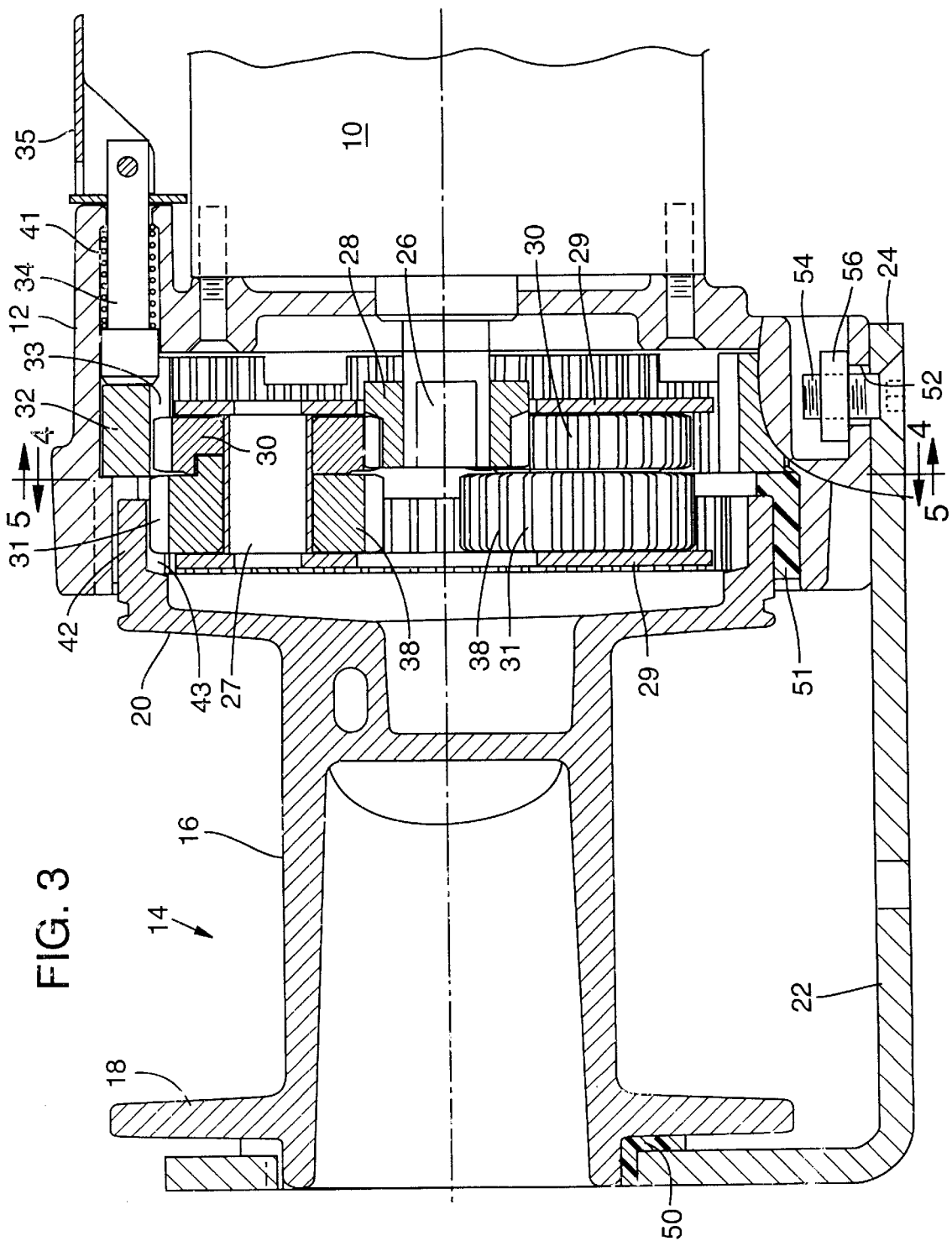
FIG. 3 is a section view of the winch of FIG. 1 showing the components in assembled relation.

FIG. 1 illustrates a utility winch contemplated by the present invention which includes a motor 10, a gear housing 12, a rotatable reel 14 including a hub 16 and flanges 18 and 20. The rotatable reel 14 is supported at one end by gears and the gear housing 12 (to be explained hereafter) and at the other end by a bracket 22 attached to the gear and motor housing 12 at end 24.

Figure 5:
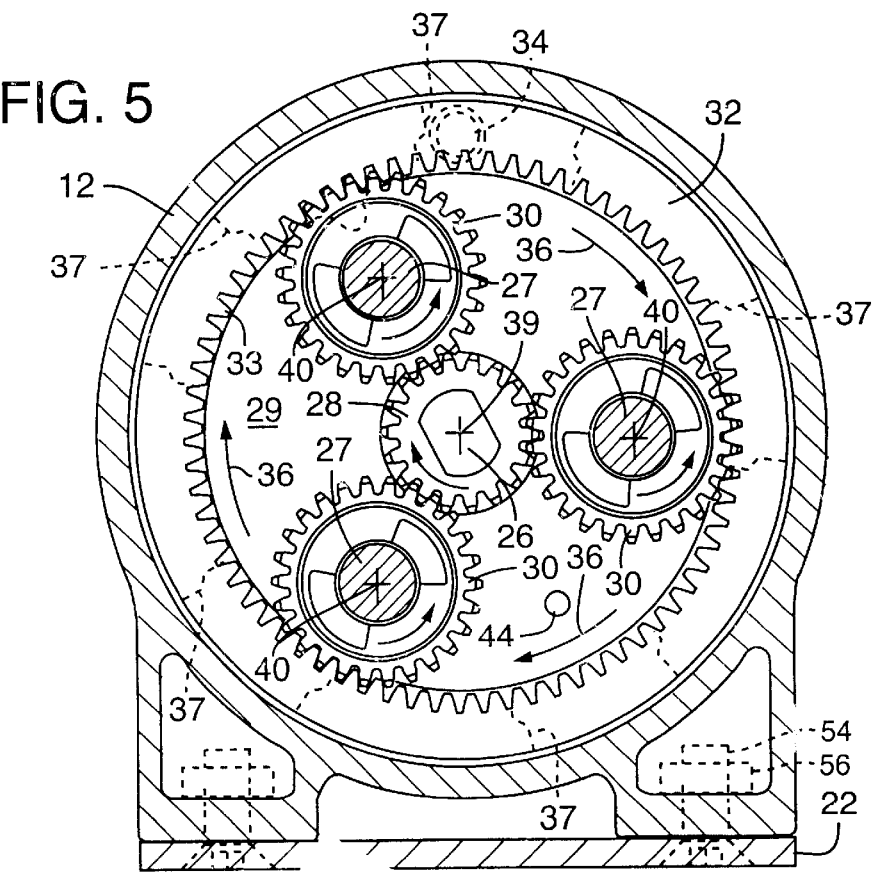
FIG. 5 ia a sectional view as taken on view lines 5—5 of FIG. 3.

With reference also to FIGS. 2, 3 and 5, motor 10 drives an armature or drive shaft 26 which directly drives a sun gear 28. FIG. 5 illustrates the sun gear 28 in engagement with three planet gears, each having an inboard planet portion 30 and an outboard extension planet portion 38. Planet portions 30 and planet extensions 38 are strategically assembled to carrier plate 29 via mounting pins 27. Surrounding the planet gear portions 30 and in meshed engagement therewith is a ring gear 32. The ring gear 32 is rotatable within gear housing 12 as provided by bearing ring 51 and is locked against rotation by spring biased lock member 34 (biased by spring 41) and which is unlatched by pin withdrawal tab 35. In a winching operation, i.e., winding of a winch cable 25 onto the hub 16, the ring gear 32 is locked against the housing 12 by the pivoting of tab 35 to release the spring urged pin 34. The pin head is accordingly urged toward the ring gear 32 and becomes seated in a notch 37.

As best seen in FIG. 5, with the ring gear 32 non-rotatable, the sun gear 28 (e.g., having 18 teeth) is rotated at high rpms. Sun gear 28 engages planet gear portions 30, e.g., having 26 teeth each, to provide one complete rotation of each of the planets for about every 1½ revolutions of the sun gear. The planet gear portions 30 are in engagement with ring gear 32 (e.g., having 70 teeth) and because the ring gear 32 is secured to the housing 12 (by lock pin 34), rotation of the planet portions 30 causes the planets to walk around the gear teeth 33 of ring gear 32. As illustrated, sun gear 28 is driven clockwise which rotates the planets counter clockwise, causing the planets to "walk" around the inner periphery of the ring gear 32 clockwise as indicated by arrows 36.

Each planet rotates 2.69 times to cause the planets to make one full circle around the axis 39 of the ring gear and sun gear. This is determined by dividing the number of teeth on the fixed ring gear (70) by the number of teeth on the planet (26).

It will be understood that the relationship of the sun gear, planets and ring gear are configured through calculation (known to the industry) to enable the teeth to be formed involute, i.e., so that the gear teeth roll into and out of engagement with minimal or no relative sliding there between. This is important to achieve efficient and quiet operation and to minimize wear on the teeth.

Figure 4:
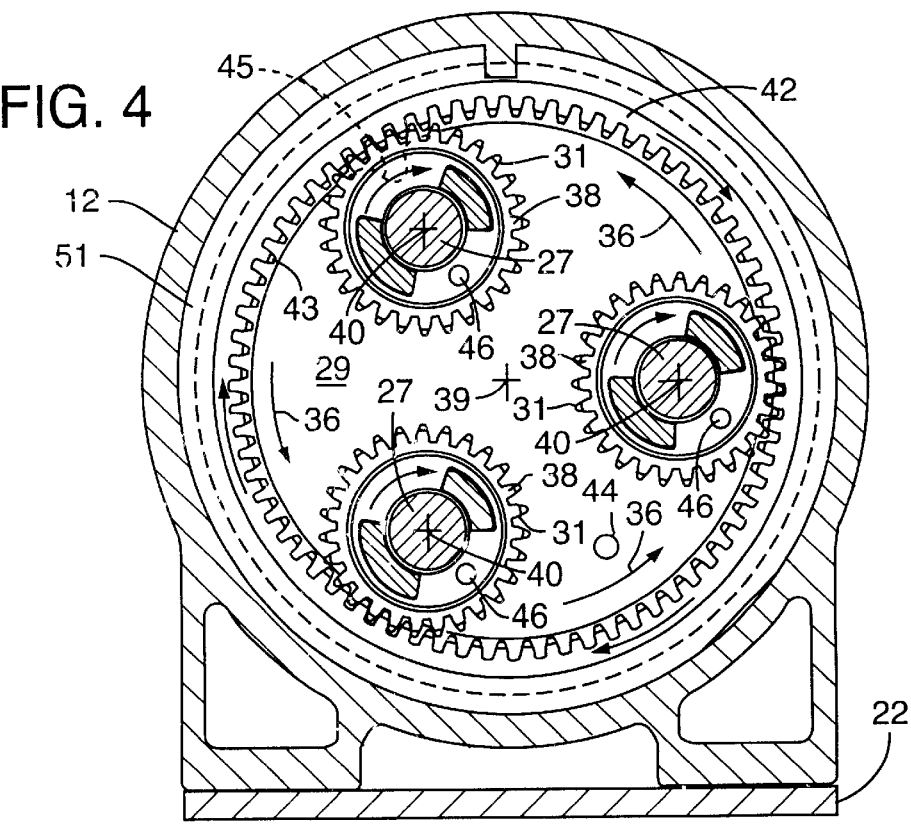
FIG. 4 is a view as taken on view lines 4—4 of FIG. 3.

Referring now to FIGS. 3 and 4, the planets are configured to each have an extended portion 38, i.e., extended axially of the sun gear 28 and ring gear 32. The extended portions 38 can be machined separately and secured to the planet portion 30 by a locking fit as shown or the planet portions can be machined from a single piece. Regardless, the extended portion 38 is fixed to the planet portion 30 and travels with the planet portion 30 both in rotation around axis 40 of each planet and in circling about the axis 39 of the ring gears.

The extended planet portions 38 are in engagement with a second rotatable ring gear 42 which rotates independent of ring gear 32 and is formed integral or fixed to flange 20 of the reel 14. Thus, rotation of the ring gear 42 produces rotation of the reel 14.

It will be observed from FIG. 3 that the inner diameter of ring gear 42 (defined by the teeth 43) is slightly larger in diameter than the inner diameter of ring gear 32 (defined by teeth 33) to enable the greater number of teeth, e.g., 71 teeth in ring gear 42 v. 70 teeth in ring gear 32. The planet extensions 38 are similarly larger in external diameter (defined by teeth 31). The planet extensions 38 are provided with 27 teeth v. 26 teeth for the planet portions 30. Again, the selection of teeth are formulated to provide involute engagement between planet extensions 38 and ring gear 42.

As previously explained, the planets 30 rotate 2.6 times to produce one complete cycle of the planets around the ring gear 32. The planet extensions 38 rotate 2.63 times to complete a full circle about the axis of ring gear 42. Thus, the planet extensions 38 will complete the circle around ring gear 42 before the planets 30 complete the circle around ring gear 32. Because the planet portions 30 and planet extensions 38 are integral (securely fixed together), the ring gear 42 is caused to rotate in reverse, i.e., counter to the circling of the planets. This reverse rotation is in the order of about one and one-half teeth per cycle of the planets about ring gear 32 and thus the reverse rotation of ring gear 42 and reel 14 is in the order of one revolution for every 45 revolutions of the circling planets. The sun gear rotates about five times for every revolution of the planets and thus about 225 times (in practice 222 times) for every revolution of the second ring gear.

Reference is now made to FIG. 2 with emphasis on the pins 27 that mount the planets to the carrier plates 29. These pins provide the bearing surfaces about which the planets rotate. The planets rotate 2.69 times for each cycling of the planets about the sun gear or ring gear axis and thus about 121 times for each revolution of the second or rotatable ring gear. A pull of 2,000 pounds on cable 25 attempting to unwind the cable from the reel 14 will be met with overmatching resistance with but a small resistance to rotation applied by the bearings to the planets. Thus, further braking is unnecessary and the less expensive, less efficient bearing pins 27 provide the required braking function when the motor 10 is inoperative. Whereas the ratio of drive to driven power as between the drive shaft and planets is reversed, a motor with but slightly greater drive power will provide the same drive power as would be required with a state of the art bearing support for the planets.

Reference is now made to FIGS. 2 and 3 with particular reference to the bracket 22. The bracket is L-shaped with a long support leg that extends from the gear housing 12 to the end of the reel. A vertical leg of the bracket carries a bearing ring 50 which rotatably supports the rim 18 of reel 14. Because ring gear 42 is part of rim 20 of reel 14, the reel needs to be properly seated with the ring gear of rim 20 secured in position relative to the planet extensions 38.

To achieve the desired seating of ring gear 42, the L-shaped bracket 22 must be properly fitted to the housing 12 so as to correctly accommodate the length of the reel. To avoid the necessity of precision manufacture of the bracket, the bolt hole 52 in housing 12 (see FIG. 3) is elongated to provide extra clearance for a bolt 54. A nut 56 is provided at the inner side of the housing and bolt 54 is inserted through a fitted hole in the bracket end 24 and through oversized hole 52 and into loose engagement with nut 56.

With the ring gear 42 properly seated, the bolt is tightened to secure the components (reel and planets) in the desired relationship. The sliding fit described allows for desired manufacturing tolerances for bracket 22 and contributes to the desired cost reduction of the winch.

A problem that is encountered in assembly of the planets and carriers to the ring gear and sun gear is that the planets need to be rotatably aligned to enable assembly onto the ring gear and sun gear. This relationship is determined and the planets and carrier are appropriately marked as shown in FIG. 2. The carrier plates 29 are provided with alignment holes 44 and notch 45. Holes or other markings 46 on gears 38 are rotated into alignment with holes 44 and notch 45 to establish the required alignment for assembly of the planet and carrier to the sun and ring gears.

The above disclosure is but an example of numerous embodiments that will become obvious to those skilled in the art. Terms as used to define the invention in the claims appended hereto are intended to have their common meaning encompassing a desired broad scope of the invention and are not intended to define merely the disclosed embodiment.

What is claimed is:

1. A winch comprising:
    a winch motor, a drive shaft selectively and rotatably driven in alternate directions by the motor, a rotatable reel including a hub and a cable attached to the hub and wound onto and off of the hub upon rotation of the reel;
    a planet assembly connecting the drive shaft to the reel for selective rotation of the reel, said planet assembly including a first ring gear that is tendered non-rotatable, a sun gear driven by the drive shaft and planet portions engaging the sun gear and first ring gear;
    planet extensions fixed to and axially extended from said planet portions and not in engagement with the sun gear and the fixed ring gear;
    a second ring gear rotatable relative to said first ring gear and in engagement with said planet extensions and not in engagement with said planet portions, said reel secured to said second ring gear and rotatable with said second ring gear;
    said first and second ring gears having internal teeth, one of said ring gears having a greater number of teeth and defining a larger circumference and diameter than the teeth of the other ring gear, and said planet portions and planet extensions having external teeth, one of said planet portions and planet extensions having a greater number of teeth and defining a larger circumference and diameter than the teeth of the other of said planet portions and planet extensions, said one of said planet portions and planet extensions in engagement with said one of said ring gears and the other of said planets portions and planet extensions in engagement with the other of said ring gears whereby the common cycling of the planet portions and planet extensions about the first ring gear axis produces reduced rotation of the second ring gear and reel.

2. A winch as defined in claim 1 wherein the engagement of the teeth of the planets with the teeth of the ring gears is an involute engagement.

3. A winch as defined in claim 2 wherein the second ring gear has one more internal tooth than the first ring gear and the planet extensions engaged therewith each have one more external tooth than the planet portions.

4. A winch as defined in claim 3 wherein the planet extensions complete one circuit of the second ring gear at a rate faster than the planet portions complete one circuit of the first ring gear to produce rotative direction of the reel in reverse to the rotative direction of the cycling planet assembly.

5. A winch as defined in claim 1 wherein the planet portions and planet extensions are supported by a common carrier and have a common bearing support relative to the carrier, said bearing having limited friction resistance that resists and does not prevent rotation of the planets, said resistance being magnified by gear reduction when a load attempts unwinding of the cable from the reel with the motor inactive to thereby prevent unwinding of the cable from the reel.

6. A winch as defined in claim 1 wherein the reel is affixed to the motor housing by a configured bracket that supports a distal end of the reel and extends around the reel to the housing where an end of the bracket underlies the housing, said housing and said end of the bracket having aligned holes and a bolt extended through the aligned holes and into threaded engagement with a nut, one of said holes oversized to enable limited adjustment of the bracket relative to the housing with the bolt and nut in loose relation and following adjustment and upon tightening of the bolt and nut providing a fixed relation between the reel and housing.

7. A winch as defined in claim 1 wherein assembly of the planet assembly to the sun and ring gears requires a determined rotative alignment of the planet gear portions, said planet gear portions rotatably mounted on carrier plates, said carrier plates having holes and said planet gear portions having markings that when aligned with said holes defines the determined rotative alignment of the planet gear portions.

* * * * *

UNITED STATES PATENT AND TRADEMARK OFFICE
CERTIFICATE OF CORRECTION

| | |
|---|---|
| PATENT NO. | : 6,604,731 B2 |
| DATED | : August 12, 2003 |
| INVENTOR(S) | : Stephen Ray Hodge |

Page 1 of 1

It is certified that error appears in the above-identified patent and that said Letters Patent is hereby corrected as shown below:

<u>Column 5,</u>
Line 31, "tendered" should be -- rendered --.

Signed and Sealed this

Fourth Day of November, 2003

JAMES E. ROGAN
*Director of the United States Patent and Trademark Office*